Figure 1:
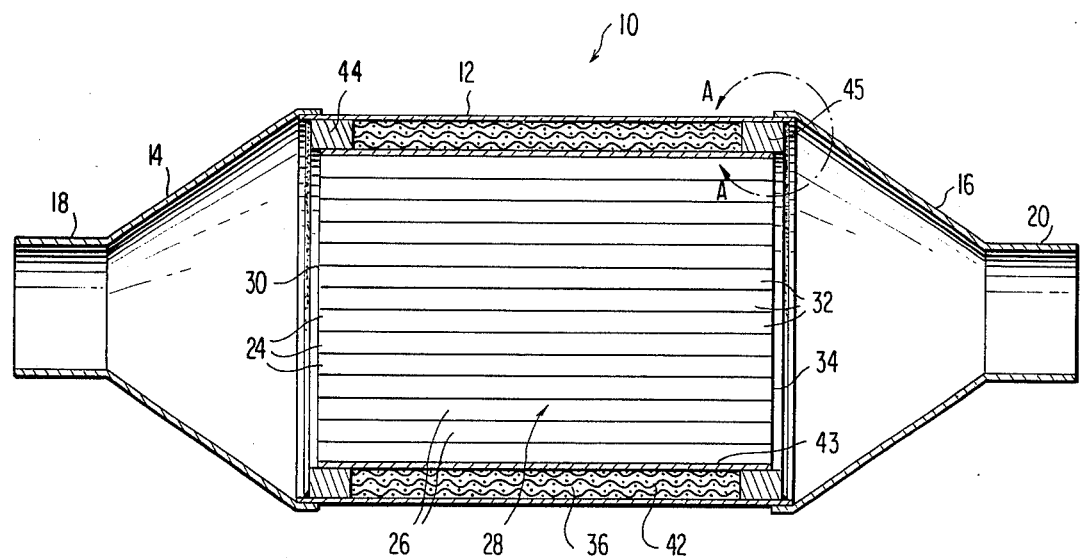

United States Patent [19]

Rosynsky et al.

[11] 4,142,864
[45] Mar. 6, 1979

[54] CATALYTIC APPARATUS

[75] Inventors: Victor Rosynsky, Elizabeth, N.J.; Alfred Stawsky, Bronx, N.Y.

[73] Assignee: Engelhard Minerals & Chemicals Corporation, Iselin, N.J.

[21] Appl. No.: 802,167

[22] Filed: May 31, 1977

[51] Int. Cl.$^2$ .......................... B01J 8/02; B01J 35/04; F01N 3/15
[52] U.S. Cl. .................................. 422/179; 422/180
[58] Field of Search .............. 23/288 FC; 60/299, 301

[56] References Cited

U.S. PATENT DOCUMENTS

| | | | |
|---|---|---|---|
| 3,798,006 | 3/1974 | Balluff | 23/288 FC |
| 3,854,888 | 12/1974 | Frietzsche et al. | 23/288 FC |
| 3,948,611 | 4/1976 | Stawsky | 60/299 X |
| 3,963,445 | 6/1976 | Koyama et al. | 23/288 FC |
| 4,004,888 | 1/1977 | Musall | 23/288 FC |

FOREIGN PATENT DOCUMENTS

| | | | |
|---|---|---|---|
| 2213539 | 10/1973 | Fed. Rep. of Germany | 23/288 FC |
| 2525660 | 12/1975 | Fed. Rep. of Germany | 23/288 FC |
| 2525662 | 12/1975 | Fed. Rep. of Germany | 23/288 FC |

Primary Examiner—Morris O. Wolk
Assistant Examiner—Michael S. Marcus

[57] ABSTRACT

A catalytic, gas treating apparatus in which a unitary ceramic catalytic element having gas flow passages therethrough, is positioned within a metallic casing in a manner providing a space between the casing and the catalytic element. A resilient member which is compressible both radially and longitudinally is positioned around the catalytic element in said space to resiliently hold the catalytic element. A plug member is positioned at least partially in said space, and, for instance, around the catalytic element at opposite end portions of the catalytic element, in a manner which longitudinally compresses said resilient member to a substantial extent to increase the holding force exerted on the catalytic element by the resilient member and thereby inhibit axial movement of the catalytic element during use. The device avoids the necessity of providing end flanges extending from the casing and overlapping the periphery of the end faces of the catalytic element for the purpose of minimizing axial movement of the catalytic element, and, as a result, essentially all of the gas flow passages remain available to the flow of the gas to be treated and there is maximum catalyst utilization.

20 Claims, 10 Drawing Figures

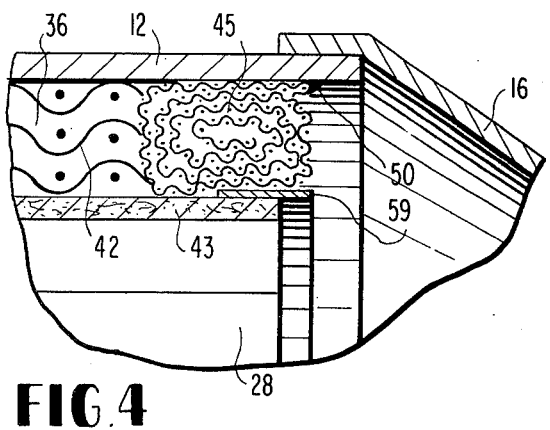
FIG.4
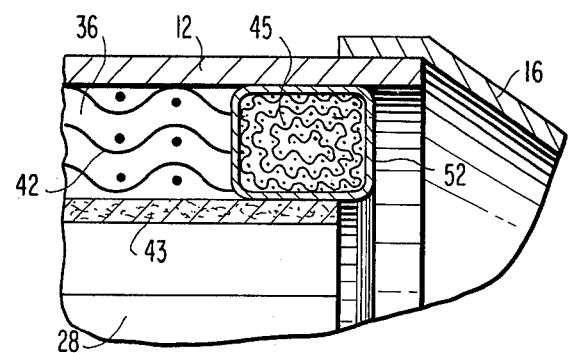
FIG.5
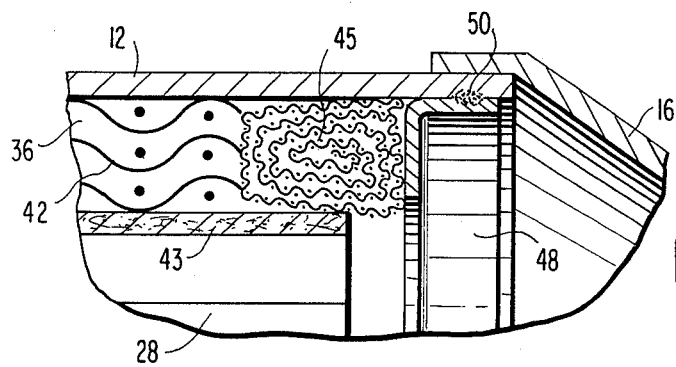
FIG.6
FIG.7
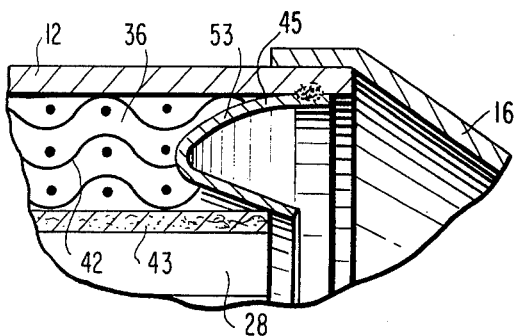
FIG.8
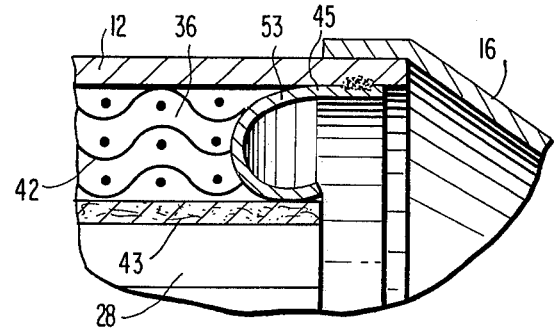
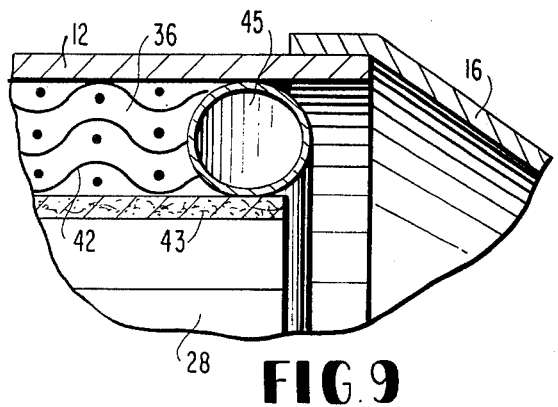
FIG.9
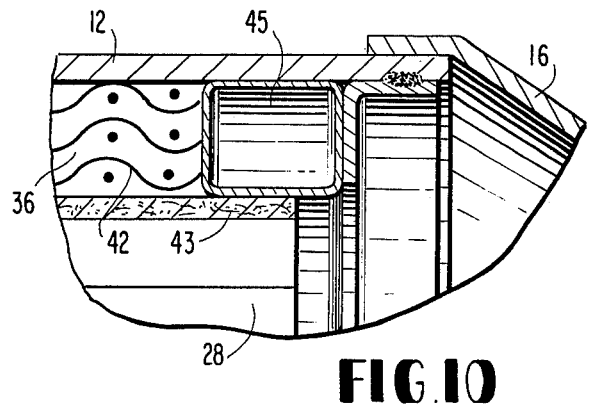
FIG.10

CATALYTIC APPARATUS

This invention relates to a catalytic apparatus suitable for treating gases, and the device finds particular utility in the treatment of exhaust gases from internal combustion engines in order to decrease pollution of the atmosphere.

Gases of various sorts are often discharged or exhausted into the air and, frequently, these gases serve to add undesirable materials or pollutants to the atmosphere. Although the problem has been under study for years and many different types of devices have been devised for combating the difficulty, it is becoming increasingly important that such pollution be minimized.

A particular problem resides in the purification of gases such as those emanating from internal combustion engines, e.g., those employed in automotive vehicles. The exhaust products from the engines, which usually burn a hydrocarbon fuel such as hydrocarbon gases, gasoline or diesel fuel, can cause serious pollution of the atmosphere. Among the pollutants in these exhaust gases are hydrocarbons and oxygen-containing compounds, the latter including nitrogen oxides and carbon monoxide. The removal of these contaminants from the gases or the conversion of the pollutants to less objectionable materials is of significant importance to the well-being of our society.

U.S. Pat. No. 3,441,381 is directed to a catalytic apparatus which has been employed to purify various gases such as exhaust gases, and the device is particularly efficacious in the treatment of exhaust gases emanating from internal combustion engines which burn hydrocarbon or other fuels. Briefly, the device has a casing section which houses a unitary catalyst having a plurality of gas flow channels or paths therethrough and a gas inlet and outlet are provided. The outer dimensions of the catalytic element, which is generally of the same cross-sectional shape as the casing, are somewhat smaller than the internal dimensions of the casing in order to provide a relatively thin space between the casing and the catalyst and permit placement of resilient cushioning around the catalytic element. In order to hold the catalytic element snugly within the casing without undue damage, the resilient, flexible member is generally positioned under compression in the space between the casing and the catalyst. The catalytic element is relatively fragile when made of a refractory, ceramic material, while the casing is metallic. The flexible member around the catalytic element serves to compensate for differences in expansion or contraction between the catalytic element and the casing to avoid breakage of the catalytic element due to the occurrence of such differences over the wide temperature range experienced by the device. For example, the temperature is frequently cycled from ambient temperature when the device is not in use to temperatures up to about 800° C. or more during use. The flexible member also absorbs vibrational shocks to the casing or catalytic element, and thereby further reduces the possibility of catalyst breakage.

In a preferred device of U.S. Pat. No. 3,441,381, each end of the catalytic element is in contact with a flange which extends in a direction inwardly with respect to the casing. These flanges extend around the inner surface of the casing and bridge the space between the casing and the catalytic element. The flanges overlap sufficiently across the respective end faces of the catalytic element to hold it against axial movement within the casing. Also, it is desired that the flanges aid in keeping the gas which is being treated from bypassing the catalytic element by blocking each end of the space between the catalytic element and the casing so that the gases cannot avoid passing through the catalytic element as they travel from the inlet to the outlet of the device.

Although the apparatus of U.S. Pat. No. 3,441,381 has given excellent service in purifying the exhaust of commercial vehicles employing internal combustion engines, the flanges which overlap the catalyst faces obstruct access of the gas to the flow passages which are covered by the inwardly positioned ends of the flanges. Although such overlap may not be great, it extends around the outer edge of the catalyst element which often removes from active use, a significant percentage of catalyzed surface area in the blocked-off flow passages and makes non-functional the metal catalyst material therein. Often the catalytic metal component is comprised of precious metal such as platinum group metal, and the portion of this expensive material in the blocked-off passages represents an economic loss, and the resulting decrease in the amount of catalyst available for contact with the gases being treated may give rise to the necessity of increasing the overall size of the device which often must be positioned during use in a very limited space. Nevertheless, such flanges have been incorporated in many of these devices in commercial use since it has been considered, for instance, that the overlap was needed to positively hold the ends of catalytic element to reduce its axial movement in the casing, which otherwise could result in mechanical breakage of the element. Also, the overlapping elements such as flanges, or flanges with resilient end gaskets between the ends of the catalytic element and the flanges, are typically used to provide axial preloading of the catalytic element in the assembly to eliminate or limit small, cyclical, axial movements which have been known to cause physical damage, axial extrusion, and at times to lead to physical failure of the catalytic element or the flanges or gaskets.

The present invention relates to a catalytic gas treating apparatus of the general type aforedescribed but permits the gases undergoing treatment to have access to essentially the complete cross-sectional area of the end faces of the catalytic element and thus essentially all of the catalyst-bearing flow passages in the element to permit more effective utilization of the catalytic activity of the device. In accordance with the present invention, a plug member is positioned at least partially in the space between the catalytic element and its surrounding casing, for instance, around the opposite end portions of the catalytic element, and in a manner which longitudinally compresses the resilient member in the space to increase to a significant extent the holding force exerted on the catalytic element by the resilient member. The plug member thereby serves as an essential means inhibiting axial movement of the catalytic element during use. Sufficient compressive force can be exerted on the resilient member to avoid the necessity of providing end flanges which overlap the periphery of the end faces of the catalytic element, and, as a result, essentially all of the flow passages in the catalytic element remain available to the flow of the gas to be treated and there is maximum catalyst utilization. Thus, axial movement of the catalytic element is primarily, if not entirely, prevented by the resilient member which is positioned around the catalytic element being compressed to a sufficient extent by the plug member that the resilient member has an adequate hold on the catalytic element at substantially all conditions under which the device is employed. Elimination of the overlap of flanges onto the catalyst face and the resulting increased active catalytic material thereby made available, may permit reduction of the precious metal loading in the catalytic element, of the length of the catalytic element, and/or of the diameter of the total frontal area required for a given use. Moreover, the plug member generally aids in preventing passage of the exhaust gas into the area between the catalytic element and the casing, thereby assuring that essentially all of the gas being treated passes through the catalytic element. These and other aspects and advantages of the present invention are apparent in the following detailed description, particularly when considered in conjunction with the accompanying drawings in which like parts bear like reference numerals. In the drawings:

FIG. 1 is a sectional view of a catalytic gas treating apparatus made in accordance with the present invention; and FIG. 2 through 10 are enlarged fragmentary sectional views of portion A—A of FIG. 1, illustrating various embodiments of plug members which can be incorporated into the catalytic gas treating apparatus in accordance with the present invention. Catalytic gas treating apparatus 10, depicted in FIG. 1 as illustrative of the present invention includes a casing 12 and frustoconical end closure members 14 and 16. Inlet conduit 18 is integral with frustoconical end member 14, and, likewise, outlet conduit 20 is integral with frustoconical end member 16. Conduits 18 and 20 permit connection of the catalytic gas treating apparatus 10 to a source of exhaust gases, for example passing from an internal combustion engine. The exhaust gases may be mixed with oxygen, for example from a source of air, or other reactant prior to entering conduit 18.

The main section of catalytic gas treating apparatus 10 comprises a metallic casing 12 which typically might have a generally circular cross-section with a diameter in the order of from about 2 to about 8 inches, and a length in the order of from about 2 to about 12 inches. Frustoconical end members 14 and 16 abut the gas inlet and outlet ends, respectively, of casing 12 and are secured thereto, for example, by welding. The casing and end members may have other than circular cross-sections.

Frustoconical end member 14 is dimensioned so as to enable distribution or passage of exhaust gases over the entire or substantially the entire cross-sectional area of the upstream portion of casing 12, thereby causing such exhaust gases to enter all or substantially all of the inlet openings 24 of the gas flow channels 26 in the unitary ceramic catalytic element 28 which is positioned within casing 12 and which has a cross-section similar to, but of dimensions slightly less than those of, casing 12. The inlet openings 24 are positioned over the entire or substantially the entire area of the inlet face 30 of the unitary catalytic element 28.

Frustoconocal end member 16 is of dimensions similar to those of frustoconical end member 14, and thus of such dimensions as to enable free passage of gas out of the gas flow channels 26 via outlet openings 32 on outlet end face 34 of catalytic element 28. This free gas flow results in the passage of the gas from the gas flow channels without substantial back pressure buildup.

A layer 43 of, for instance, Fiberfax cement, a fibrous aluminum silicate, may be provided on the outer surface of catalytic element 28 to seal the pores at the outer surface of the catalytic element and also to serve as a protective coating. A space or gap 36 of substantially uniform width is defined between the inner surface of casing 12 and the outer surface of catalytic element 28. Space 36 extends completely around catalytic element 28 along the entire length of the catalytic element. Typically, annular space 36 might have a width on the order of one-eighth inch.

A resilient flexible member 42 is positioned in space 36 between the catalytic element and the inner surface of the casing. Although member 42 snugly holds the catalytic element, the radial gripping force resulting from merely placing member 42 between the catalytic element 28 and casing 12 is insufficient to prevent longitudinal movement of the catalyst element with respect to the casing during use of the device. Resilient member 42 extends essentially completely around the catalytic element 28 and longitudinally along generally the major portion of the length of the catalytic element. Resilient member 42 is constructed so that it is compressible both radially and longitudinally with respect to catalytic element 28. By way of example, resilient flexible member 42 may be a corrugated metallic structure which is foraminous such as a corrugated knitted metallic mesh fabric like that described in U.S. Pat. No. 3,441,381. Although other suitable flexible materials which are compressible in both the radial and longitudinal directions of the device may be employed, a ceramic fiber mat or blanket is preferred. The insulating properties of a ceramic fiber mounting member assist in retaining heat from the reaction of the exhaust gases being treated, and achieving and maintaining catalyst activation temperatures.

With the use of such a ceramic fiber material, the temperature generated within the device during operating conditions such as those causing oxidation, would be substantially greater at the outer surface of the catalyst element compared to that generated at the outer casing surface due to the thermal insulating properties of the ceramic fiber material. The difference between these temperatures at the two surfaces at the middle of the device has been measured to be on the order of apporximately 600° F., when the temperature on the catalyst is approximately 1200° F. to 1400° F. This temperature difference may generate a differential thermal expansion between the casing and the catalytic element to cause an increase of typically about 0.015 inch in the width of space 36. The resilient member could easily expand to fill this gap with little change in its radial gripping pressure on the catalytic element.

An end member or plug 44 is positioned at least partially within space 36 between the inner surface of casing 12 and the periphery of upstream face 30 of catalytic element 28. In the embodiment shown in the drawings, plug 44 extends completely around the catalytic element and provides a continuous barrier around the periphery of the catalytic element to block flow of unpurified exhaust gas into space 36 without blocking any of inlet openings 24.

A similar plug 45 is positioned at least partially within space 36 at the gas outlet end face 34 of catalytic element 28 and completely therearound. Plug 45 thus, provides a continuous barrier around the periphery of catalytic element 28 to block gas flow through space 36 without blocking any of the exit openings 32 of flow channels 26 in catalytic element 28.

During operation, the difference in temperature at the edge areas of the catalytic element where the plugs are located may typically be about 300° F. or somewhat less. This condition may generate a differential thermal expansion between the casing and catalytic element to cause an increase of typically about 0.008 inch in the width of space 36. The plugs 44 and 45 may, therefore, tend to lose contact with the outer surface of the catalyst element 28, and whether or not this occurs the primary radial gripping pressure is directly supplied by the resilient member to the catalytic element to hold it against axial movement during use.

During the placing of catalyst element 28 within casing 12, resilient flexible member 42 undergoes compression between the outer surface of the catalyst element and the inner surface of the surrounding casing. The extent to which the plugs 44 and 45 are positioned longitudinally towards the middle of the device causes a corresponding decrease in the size of the space occupied by resilient member 42, and generally determines the amount of compressive force exerted by the plugs 44 and 45 on resilient member 42. In accordance with the present invention, plug members 44 and 45 are positioned within space 36 to longitudinally compress resilient member 42 sufficiently to increase the radial gripping force and provide an essential means holding catalytic element 28 against axial movement during its use. This compression is at least sufficient to cause resilient member 42 to adequately hold the catalyst element against undesirable longitudinal or axial movement within the casing without necessitating the use of flanges or other structure which overlaps the end faces of the catalytic element. The extent of such compression of resilient member 42 by the plugs 44 and 45 generally causes an increase in the gripping force exerted by member 42 on the catalytic element of at least about 5% compared with such force prior to compression of resilient member 42 by plugs 44 and 45, preferably this increase is at least about 10%.

Many, if not all, of the useful resilient members will have a structure such that at least before longitudinal compression, e.g. by plugs 44 and 45, only a minor portion of space 36 will be occupied by the solid material of resilient member 42 even though the outer dimensions of member 42 may correspond to those of space 36. Thus resilient member 42 may have voids within its structure as in the case of fibrous mats, knitted wire meshes and the like. In any event, after longitudinal compression the resilient material is confined within a still smaller portion of space 36. For example, before longitudinal compression, the quantity of solid material per unit volume of space 36 occupied by the resilient member may be less than about 10% or even less than about 5%. The longitudinal compression of member 42, by, for example, placing plugs 44 and 45 in position as shown in the drawings, increases the quantity of solid material per unit volume of space 36 by at least about 20%, preferably by at least about 40%, relative to this quantity prior to adding the plugs. If desired, to provide further gripping of catalytic element 28, resilient member 42 may have an uncompressed length greater than the length of catalytic element 28 so that, when the apparatus is assembled, member 42 is longitudinally compressed by plugs 44 and 45 to a greater extent for a given final volume of space 36.

Figure 2:
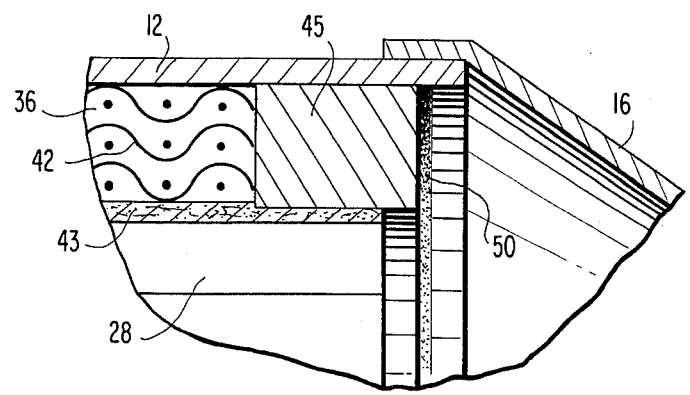

In the embodiment of the device of this invention shown in FIG. 2, plug members 44 and 45, only the latter being shown, are solid, metal structures and are interference fitted over the edge of the catalytic element 28. The interference fit assembly can be accomplished by pressing the plugs 44 and 45 inwardly into the annular space 36 from each end face of catalytic element 28. This insertion may result in a slight shear edge 49 being formed on the side surface of the catalytic element of, for example, about 0.010 to 0.030 inch deep radially. This shear ledge could further enhance the locking or plugging effect of members 44 and 45 on the resilient member 42, and may provide a slight positive additional restraint against axial movement of the catalytic element 28.

Figure 3:
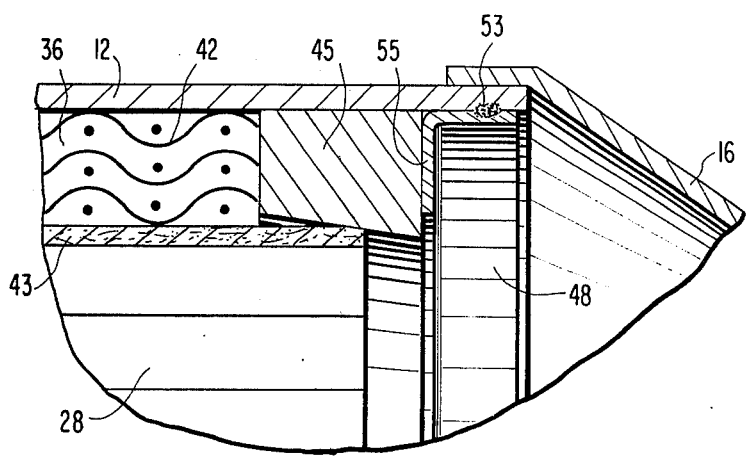

The plugs 44 and 45 may be fixedly attached to the inner surface of the casing at least indirectly. Thus, the plugs may be welded directly to the surface as in FIG. 2 at weld 50. Alternatively, as shown in FIG. 3 there may be provided retaining ring 48 adapted to hold the plugs from movement with respect to the casing and positioned with the inner surface 55 of the retaining ring 48 being radially outside of the catalytic element 28. Thus, for example, in FIG. 3 angled ring 48 is welded to the inner surface of casing 22 at weld 53 and holds a solid, metal tapered plug 45 in position in space 36. The smaller end of plug 45 projects inwardly into space 36. The tapered configuration of plug 45 and a similar plug 44 (not shown) at the opposite end of catalytic element 28 serve to compress resilient member 42 in the longitudinal direction and increase the radial gripping force of resilient member 42 on catalytic element 28 as aforesaid.

FIGS. 4, 5, and 6 depict variations of the device of the present invention in which plug rings 44 and 45 are composed of a compressed, knitted wire mesh material. This type of plug has resilient characteristics that can be controlled as to percent of solid material in the overall volume of the initial plug, and the extent of further compression of the plugs during assembly of the device so as to work most effectively with the primary resilient member 42 in gripping and restraining the catalyst from axial movement while performing the plugging function. In FIG. 4, compressed knitted wire mesh plug 45 is directly secured to casing 12 by tack weld 50. A shim 59 may be positioned between the plug and the catalytic element and extends around the latter. Compressed knitted wire mesh plugs 44 and 45 (the former not being shown) may be surrounded by a metal foil jacket 52 as shown in FIG. 5. Jacket 52 may aid in preventing gas flow into space 36. In the embodiment of the present invention shown in FIG. 6 angled ring 48 is secured to the casing by weld 50 to hold an inwardly tapered, compressed knitted wire mesh plug 45 in the compressive position against resilient member 42. A similar structure can be supplied at the opposite end of the catalytic element 28 in the device of FIG. 6 as in all of the embodiments illustrated. Also, different embodiments of the invention may be employed at the separate ends of the catalytic element 28 in a given device.

In FIGS. 7 and 8, plug rings 44 and 45 (only the latter is shown) formed by a metal ring having U-shaped cross section 53 are positioned in space 36 to longitudinally compress member 42, with the open side of the U-shape facing longitudinally away from catalytic element 28. The radius of curvature of cross-section 53 may be selected to permit members 44 and 45 to provide the desired longitudinal compressive force on resilient member 42. This U-shaped configuration of plugs 44 and 45 affords a spring gripping characteristic in the radial direction and typically opens up with the application of high temperature. This expansion tends to relieve the forming stresses on the plugs and supplies an additional radial gripping force on catalytic element 28 at the operating temperatures at which the device is employed.

FIGS. 9 and 10 depict embodiments of the device of the present invention in which the plugs comprise thin-walled, hollow, sealed, gas-filled rings. Thus rings 44 and 45 (only the latter is shown) may be of any of several cross-sectional configurations such as, for example, oval, circular, rectangular or hexagonal. The gas pressure applied to the plugs may be varied to aid in providing an effective longitudinal compressive force on resilient member 42. The increase in gas pressure within the ring due to the high operating temperatures of the device may provide an additional radial gripping pressure on catalytic element 28 while the plugs perform their end plug function.

The metal portions of the apparatus of this invention, can be made of ferrous or non-ferrous metals capable of withstanding the high temperatures to which the apparatus is subjected, for instance, up to about 800° C. and even higher. The supported catalyst 28 can comprise a unitary, solid, refractory, ceramic skeletal structure of, for instance, cordierite as the monolithic support. A catalytically-active refractory metal oxide, for instance a gamma family or activated-type alumina, can be provided on the surface of gas flow channels 26. The catalytically promoting metal component can be carried by the active refractory metal oxide. The catalytic metal component can contain, for instance, a platinum group metal, base metal, or combinations thereof deposited on the active refractory metal oxide. Alternatively, the catalytic metal may also be deposited directly on the surfaces of the skeletal structure. The catalyst may be capable of promoting a variety of reactions, e.g., oxidation, reduction or both of such types of reactions.

The unitary, skeletal structure support of the catalyst of this invention may be generally characterized as having a large plurality of flow channels or paths extending therethrough in the general direction of gas flow. The supported catalyst may be disposed in the device in such fashion that the unitary skeletal structure of the catalyst occupies the major part of the cross-sectional area of the reaction zone, with there being the narrow space 36 between it and the casing wall. Advantageously, the unitary skeletal structure is shaped to correspond to the shape of the casing in which it is to be disposed, and the unitary supported catalyst is placed therein lengthwise as to its cellular gas flow channels, i.e., with the channels extending in the general direction of gas flow so that the gases flow through the channels during their passage through the device. The flow channels need not pass straight through the catalyst structure and may contain flow diverters or spoilers.

The skeletal structure support is preferably constructed of a substantially chemically and catalytically-inert, rigid, solid material capable of maintaining it shape and strength at high temperatures, for instance up to about 1100° C. or more. The support may have a low thermal coefficient of expansion, good thermal shock resistance, and low thermal conductivity. Although the support may be a glass ceramic, it is perferably unglazed and may be essentially entirely crystalline in form and marked by the absence of any significant amount of glassy or procelain materials. Further, the skeletal structure may have walls with considerable accessible porosity as distinguished from the substantially nonporous porcelain utilized for electrical applications, for instance in spark plug manufacture, which is characterized by having relatively little accessible porosity. The skeletal structure supports may be comprised, for example, of one or more cordierite, cordierite-alpha-alumina, zircon-mullite, spodumene, alumina-silica-magnesia, sillimanite, magnesium silicates, zircon, petalite, alpha-alumina and aluminosilicates.

The gas flow channels of the unitary ceramic skeletal supported catalyst may be thin-walled channels providing a relatively large amount of superficial surface area. The channels can be one or more of a variety of cross-sectional shapes and sizes. The channels can be of the corss-sectional shape, for example, of a trapezoid, rectangle, triangle, square, hexagon, sinusoid, or circle so that cross-sections of the support represent a repeating pattern that can be described as a honeycomb, corrugated or lattice structure. The walls of the cellular channels are generally of a thickness necessary to provide a strong unitary body, and the thickness will often be in the range of about 2 to 25 mils or more. The structure may contain from about 50 to 2500 or more gas inlet openings for the flow channels per square inch of cross-section, and a corresponding number of the gas flow channels, preferably about 150 to 500 gas inlets and flow channels per square inch. The open area of the cross-section may be in excess of 60% of the total area. The size and dimensions of the unitary refractory skeletal support of this invention can be varied. The support is unitary or monolithic in the sense that a significant portion, preferably a major portion or even essentially all, of its cross-section is composed of one interconnected skeletal structure or unit. Generally, such a unit has a cross-sectional area of at least about two square inches, preferably at least about four square inches.

In one type of operation, the exhaust gases from an internal combustion engine, for instance that of a spark-ignition, reciprocating, internal combustion engine of an automobile or fork lift truck, and containing combustible, air-polluting constituents, for instance hydrocarbons, oxygenated hydrocarbons and carbon monoxide, pass at high velocity from the engine exhaust system in admixture with an amount of oxygen required for the combustion of the combustible constituents, and preferably in excess of the stoichiometric amount required for such combustion. The oxygen may be present in the exhaust gases as the result of the engine burning a lean fuel mixture, or oxygen, for instance, as air, may be added to the exhaust gases. The exhaust gases containing oxygen pass at elevated temperature within inlet conduit 18 of catalytic treatment apparatus 10, and into and through the multiplicity of flow channels 26 extending through a supported oxidation catalyst 28. The gaseous admixture contacts the active catalyst component on and within the flow channels 26 at a temperature of the supported catalyst of typically about 150° C.–700° C., whereby the combustible air-polluting constituents are oxidized to more innocuous gases such as $CO_2$ and $H_2O$. The thus-purified gases are then passed from purifier 10 through discharge conduit 20 either directly into the atmosphere or into a tail pipe or conduit for ultimate discharge to the atmosphere. During this operation, the catalyst element is held relatively stationary, but resiliently, within casing 12 by the resilient member 42.

We claim:

1. An apparatus for treating gases comprising:
   a. a metallic casing defining an enclosure and having a gas inlet and a gas outlet that communicate with said enclosure;
   b. a catalytic element of lesser dimension than said enclosure and positioned in the casing in a manner providing a space extending around the catalytic element between the catalytic element and the inner surface of the casing, said catalytic element comprising a unitary skeletal ceramic structure having gas flow passages therethrough;
   c. a resilient, flexible member snugly holding said catalytic element and positioned under compression radially between the catalytic element and the inner surface of the casing, said resilient member being compressible longitudinally with respect to said catalytic element; and
   d. at least one plug member at least partially within said space between the inner surface of the casing and the periphery of the catalytic element, said plug member being positioned within said space to longitudinally compress said compressed resilient flexible member to provide a quantity of solid material per unit volume of said space occupied by said resilient member which is at least about 20% greater relative to said quantity before said longitudinal compression, and sufficiently to hold said catalytic element against axial movement during its use.

2. The apparatus of claim 1 wherein said plug is solid metal.

3. The apparatus of claim 1 wherein said plug is tapered with the smaller end of the plug projecting into said space.

4. The apparatus of claim 1 wherein the plug has a U-shaped cross-section with the open end of the U-shape facing longitudinally away from said catalytic element.

5. The apparatus of claim 1 wherein the plug comprises a thin-walled hollow, sealed, gas-filled member.

6. The apparatus of claim 1 wherein said longitudinal compression increases the quantity of solid material per unit volume of said space occupied by said resilient member by at least about 40%.

7. The apparatus of claim 1 wherein said resilient member comprises a ceramic fiber material.

8. The apparatus of claim 7 wherein the plug comprises compressed wire mesh.

9. The apparatus of claim 8 wherein the plug is jacketed with metal foil.

10. The apparatus of claim 7 further comprising a retaining means affixed to said casing and adapted to hold said plug from movement with respect to said casing, the inner surface of said retaining means being radially outside of said gas flow passages of said catalytic element.

11. An apparatus useful for treating gases comprising:
    a. a metallic casing defining an enclosure and having a gas inlet and a gas outlet that communicate with said enclosure;
    b. a catalytic element of lesser dimension than said enclosure and positioned in the casing in a manner providing a space extending around the catalytic element between the catalytic element and the inner surface of the casing, said catalytic element comprising a unitary skeletal ceramic structure having gas flow passages therethrough;
    c. a resilient, flexible member snugly holding said catalytic element and positioned under compression radially between the catalytic element and the inner surface of the casing, said resilient member being compressible longitudinally with respect to said catalytic element; and
    d. a plug member at each of the opposite end portions of the catalytic element and at least partially within said space between the inner surface of the casing and the periphery of the catalytic element, said plug members being positioned within said space to longitudinally compress said compressed resilient flexible member to provide a quantity of solid material per unit volume of said space occupied by said resilient member which is at least about 20% greater relative to said quantity before said longitudinal compression, and sufficiently to hold said catalytic element against axial movement during its use.

12. The apparatus of claim 11 wherein said resilient member comprises a ceramic fiber material.

13. The apparatus of claim 11 further comprising retaining means affixed to said casing and adapted to hold said plugs from movement relative to the casing, the inner surface of said means being radically outside of said gas flow passages of said catalytic element.

14. The apparatus of claim 11 wherein said plugs have a U-shaped cross-section with the open end of the U-shape facing longitudinally away from said catalytic element.

15. The apparatus of claim 11 wherein the plugs comprise thin-walled, hollow, sealed, gas-filled members.

16. The apparatus of claim 11 wherein said plugs are solid metal.

17. The apparatus of claim 11 wherein said plugs comprise compressed wire mesh.

18. The apparatus of claim 18 wherein at least one of said plugs is jacketed with metal foil.

19. The apparatus of claim 11 wherein said plugs are tapered with the smaller end of the plugs projecting into said space.

20. The apparatus of claim 19 wherein said longitudinal compression increases the quantity of solid material per unit volume of said space occupied by said resilient member by at least about 40%.

* * * * *

UNITED STATES PATENT AND TRADEMARK OFFICE
CERTIFICATE OF CORRECTION

PATENT NO. : 4,142,864
DATED : March 6, 1979
INVENTOR(S) : ROSYNSKY, V. and STAWSKY, A.

It is certified that error appears in the above-identified patent and that said Letters Patent are hereby corrected as shown below:

In Column 3, line 62, change "Frustoconocal" to

--Frustoconical--.

In Column 10, line 48, Claim 18, delete [claim 18] and substitute therefor --claim 17--.

Signed and Sealed this

Third Day of July 1979

[SEAL]

*Attest:*

*Attesting Officer*

LUTRELLE F. PARKER
*Acting Commissioner of Patents and Trademarks*